United States Patent [19]

Kranich

[11] Patent Number: 5,546,560
[45] Date of Patent: Aug. 13, 1996

[54] DEVICE AND METHOD FOR REDUCING BUS ACTIVITY IN A COMPUTER SYSTEM HAVING MULTIPLE BUS-MASTERS

[75] Inventor: Uwe Kranich, Munich, Germany

[73] Assignee: Advance Micro Devices, Inc., Sunnyvale, Calif.

[21] Appl. No.: 81,080

[22] Filed: Jun. 22, 1993

[51] Int. Cl.$^6$ ................................................. G06F 12/00
[52] U.S. Cl. ..................... 395/468; 395/285; 364/DIG. 1
[58] Field of Search .................................. 395/425, 445, 395/403, 446, 451, 468, 471, 473

[56] References Cited

U.S. PATENT DOCUMENTS

| 5,185,878 | 2/1993 | Baror et al. | 395/425 |
|---|---|---|---|
| 5,261,106 | 11/1993 | Lentz et al. | 395/425 |
| 5,265,235 | 11/1993 | Sindhm et al. | 395/445 |
| 5,293,384 | 3/1994 | Keeley et al. | 395/275 |
| 5,388,224 | 2/1995 | Maskas | 395/308 |

FOREIGN PATENT DOCUMENTS 0301354  2/1989  European Pat. Off. .

OTHER PUBLICATIONS

Al–Sadoun et al., "Cache Coherency in Multiple Bus Systems", Inter. J. Electronics, vol. 73, No. 3, Sep. 1993, pp. 497–522.

*Primary Examiner*—Rebecca L. Rudolph
*Attorney, Agent, or Firm*—Foley & Lardner

[57] ABSTRACT

A method and device for avoiding unnecessary data broadcasts by detecting the presence of additional cache-equipped bus-masters is provided. The device includes a master bus-master equipped with a local cache arrangement for caching data originating in a system memory. The master bus-master communicates with the system memory over a bus, and is coupled to a control line at an input. Any cache-equipped slave bus masters that are caching data with the system memory are coupled to the control line by an output and are configured to generate a signal at the output to drive the control line to a predetermined state to indicate that they are caching data. The master bus-master detects the state of the control line and determines whether the data being buffered in its local cache arrangement is shared based upon the state of the control line. If the state of the control line indicates the presence of other cache-equipped bus-masters, the master bus-master automatically broadcasts data that it modifies; otherwise it writes the modified data back to the system memory when the cache space occupied by the modified data is required for new data.

20 Claims, 4 Drawing Sheets

DEVICE AND METHOD FOR REDUCING BUS ACTIVITY IN A COMPUTER SYSTEM HAVING MULTIPLE BUS-MASTERS

FIELD OF INVENTION

The present invention relates to a device and method for controlling cache operations, and more particularly to a device and method for reducing bus activity in a computer system having a cache-equipped bus-master.

BACKGROUND OF INVENTION

Bus-masters are devices that can initiate a read or write transaction with the system memory of a bus-based computer system. An example of one such device is a processor. Processors retrieve instructions from the system memory and read, process, and write data to the system memory as dictated by the retrieved instructions.

One way to increase the performance of a computer system is to increase the rate data is transferred between the system memory and the bus-masters in the system. This can be accomplished by using high-speed memory chips for the system memory. However, the cost of memory increases dramatically with the speed of the memory. Thus, it is rarely practical to use the fastest memory available, especially in systems which require large quantities of system memory. Consequently, it has been discovered that by using a relatively small bank of relatively high-speed memory ("cache memory") as a buffer between a bus-master and the larger, slower bank of system memory, system performance can be greatly improved.

The data transfers between the system memory and the cache memory of a bus-master are controlled by a cache controller. A cache controller manages the cache memory based upon the needs of the bus-master which it serves. For example, if a processor requires data that is not currently stored in the processor's cache memory, the data must be transferred from the slower system memory to the cache memory of the processor. Once the data resides in the processor's cache memory, the processor may access the data for subsequent operations at the faster rate of the cache memory. Further, if the processor requires information that does not reside in cache memory and all of the cache memory blocks are already allocated, then the cache controller causes the cache memory to free up storage space for the newly requested data, either by writing over unmodified data in the cache memory or by storing modified data back to the system memory.

In systems having more than one cache, advantages may be gained by sharing one or more cache lines among multiple cache memories. However, such sharing could lead to data conflicts when multiple cache memories assert ownership over the same cache line at the same time. To avoid such conflicts, a protocol must be implemented to allocate the ownership of the cache lines among the various cache memories. Such protocols are referred to herein as ownership protocols, and generally allow the transfer of ownership of a cache line from one cache memory to another.

Ownership protocols may be adapted to govern cache line ownership on systems having more than one cache-equipped bus-master, such as a system with a cache-equipped processor and a cache-equipped I/O device. However, in such a system, multiple versions of the same data may exist. For example, both the cache memory of the processor and the cache memory of the I/O device may hold copies of data originating from the same block in the system memory. Data that is accessible by more than one cache-equipped bus-master is referred to as "shared data". If either the I/O device or the processor modifies a block of shared data in its local cache memory, all other copies of the data, including any copy of the data in the cache of the other bus-master, become "stale" (no longer current).

To prevent the use of stale data, the bus-master that modifies a block of shared data must broadcast the modified version of the data to all other cache-equipped bus-masters in the system. However, this broadcasting process inherently requires a large amount of inter-device communication. Such communication is typically performed over the same bus which connects the bus-masters with the system memory. As a result, these busses can become crowded, resulting in slower data transmission rates and diminished system performance.

In view of the foregoing, a device and method for making a cache-equipped bus-master aware of whether any other cache-equipped bus-master is present in the system is clearly desirable. Further, a device and method which allows a cache-equipped bus-master to determine whether other cache-equipped bus-masters are on the system without increasing the data traffic on the bus connecting the bus-masters to the system memory is clearly desirable. Finally, a device for determining the shared status of a data block without increasing the data traffic on the bus connecting the bus-masters to the system memory is clearly desirable.

SUMMARY OF INVENTION

According to one aspect of the present invention, a bus-master for use in a bus-based computer system having a system memory is provided. The bus-master includes a processing unit, a local cache arrangement coupled to the system memory by a bus and to the processing unit. The bus-master caches data between the processing unit and the system memory. The bus-master further includes an input coupled to a control line for detecting a logic state of the control line. The logic state of the control line indicates whether another cache-equipped bus-master is present in the computer system. The local cache arrangement is coupled to the input and controls the transmission of data between the bus and the cache memory in response to the logic state of the control line.

According to another aspect of the present invention, a bus-based computer system is provided. The computer system includes a system memory, a bus coupled to the system memory, and a control line having a logical state. The logical state initially is a first state. The system further includes a master bus-master that includes a processing unit, a detecting means coupled to the control line for detecting the state of the control line, and a local cache arrangement coupled to the bus, to the detecting means, and to the processing unit. The local cache arrangement caches data between the processing unit and the system memory. The local cache arrangement controls the transmission of data between the processing unit and the system memory in response to the state of the control line.

According to yet another aspect of the present invention, a method for preventing unnecessary data broadcasts by a caching bus-master in a bus-based computer system is provided. The method includes the steps of providing a control line with a first initial logical state, coupling the caching bus-master to the control line, and coupling a second bus-master to the control line. The method further includes the steps of causing the second bus-master to drive the control line to a second state if the second bus-master is caching data, causing the caching bus-master to detect whether the control line is at the first state or at the second state, and causing the caching bus-master to broadcast modified data only when the control line is at the second state.

BRIEF DESCRIPTION OF THE DRAWINGS

The features of the present invention, which are believed to be novel, are set forth with particularity in the appended claims. The invention, together with further objects and advantages thereof, may best be understood by making reference to the following description taken in conjunction with the accompanying drawings, in the several figures of which like reference numerals identify like elements, and wherein:

DETAILED DESCRIPTION

Figure 1:
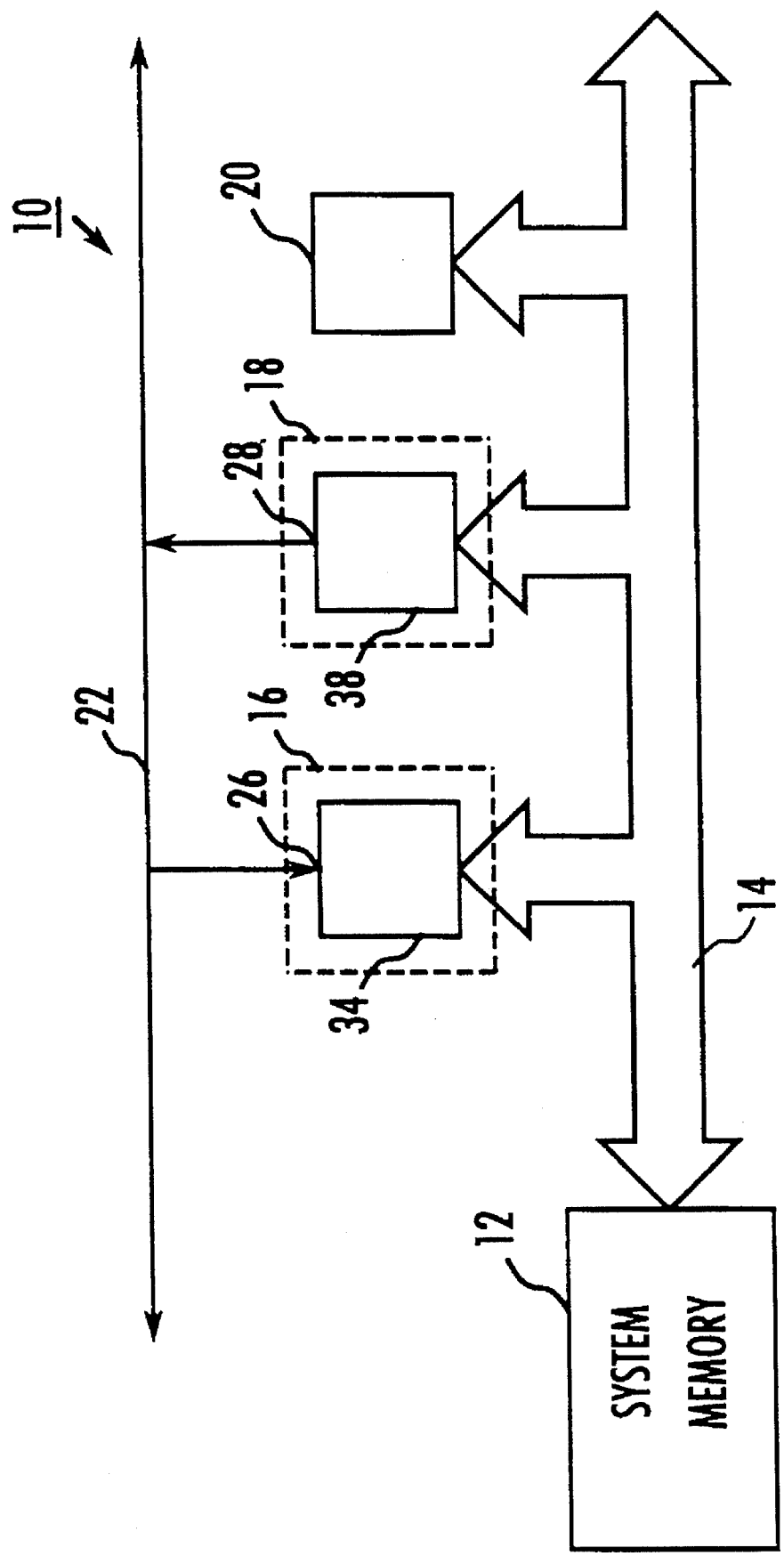
FIG. 1 is a block diagram illustrating a computer system having a plurality of bus-masters configured according to an embodiment of the present invention.

Referring now to FIG. 1, it illustrates in block diagram form a computer system 10 embodying the present invention. The computer system 10 generally includes a system memory 12, a master bus-master 16 and a plurality of slave bus-masters 18 and 20. The bus-masters 16, 18, and 20 are coupled to the memory 12 and to each other by a multiple-bit bus 14. The bus-masters 16 and 18 are further coupled to each other by a control line 22. Slave bus-master 18 is coupled to the control line 22 by an output 28 and the master bus-master 16 is coupled to the control line by an input 26.

An ownership protocol governs the allocation of the ownership of the cache lines in the system 10 among cache memories present in the system 10. The novel enhancements implemented in the ownership protocol of system 10 shall be described in greater detail hereafter.

The slave bus-master 18 is equipped with a local cache arrangement 38 and is configured to drive control line 22 to a particular state, for example, to a logical HIGH, by a control signal at output 28 to indicate if the bus-master 18 is caching data transfers between itself and the system memory 12. For example, control line 22 may initially be LOW, and bus-master 18 may be configured to generate a control signal to drive the control line 22 HIGH if bus-master 18 is caching data in its local cache arrangement 38. The slave bus-master 20 is not equipped with a local cache arrangement and is not coupled to the control line 22. Thus, slave bus-master 20 does not affect the state of control line 22.

The master bus-master 16 is equipped with a local cache arrangement 34, and is configured to detect the state of control line 22 at input 26. If the state of the control line 22 indicates that a slave bus-master is caching data, then, when master bus-master 16 modifies any of the data within its local cache arrangement 34, the master bus-master 16 broadcasts the modified data to the other bus-masters on the system over bus 14. Otherwise, if the state of the control line 22 indicates that no slave bus-master is caching data, then the master bus-master 16 does not broadcast data automatically when it modifies the data in its local cache arrangement 34.

While system 10 is shown with only two slave bus-masters 18 and 20, the system 10 may alternatively include any number of slave bus-masters. Thus, the state of control line 22 indicates to the master bus-master 16 whether any of any number of slave bus-masters in the system 10 is caching data.

Because the master bus-master 16 detects the state of the control line 22, when it is the only bus-master in the system 10 that is caching data, the data traffic on bus 14 is significantly reduced. Specifically, unnecessary data broadcasting over bus 14 is avoided because master bus-master 16 automatically broadcasts modified data only when it detects that other caching bus-masters are present on the system.

In the preferred embodiment of the present invention, the master bus-master 16 is a cache-equipped central processing unit ("CPU"). However master bus-master 16 may alternatively be any type of cache-equipped bus-master.

Figure 2:
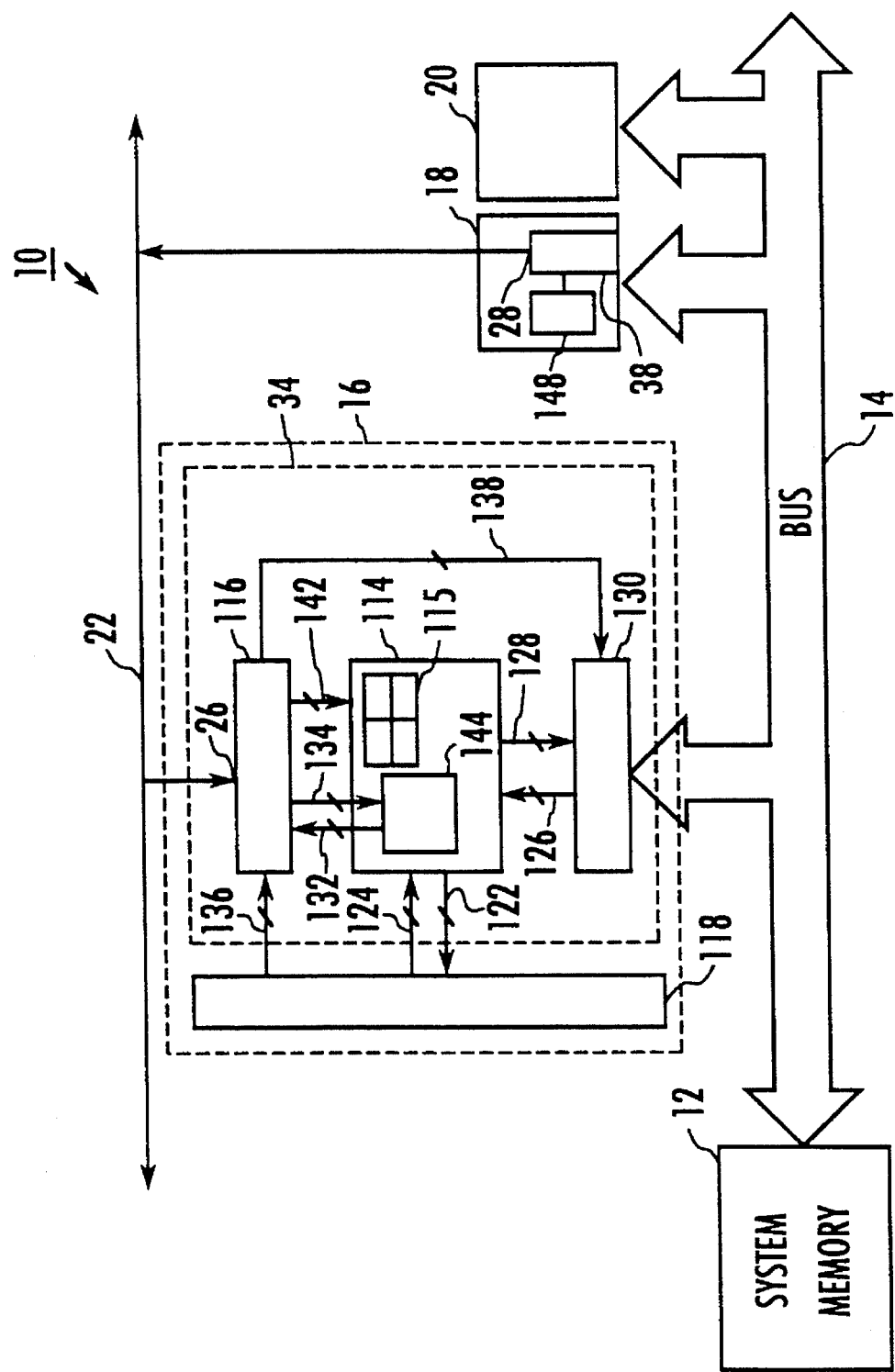
FIG. 2 is a block diagram illustrating the computer system of claim 1 in greater detail.

Referring now to FIG. 2, it illustrates in block diagram form the master bus-master 16 in greater detail. The master bus-master 16 generally comprises a processing unit 118 and the local cache arrangement 34. The processing unit 118 generally represents those components of the master bus-master 16 which manipulate data. For example, if master bus-master 16 is a CPU, then the processing unit 118 would be the execution unit of the CPU.

The local cache arrangement 34 includes a cache memory 114, a cache controller 116 and a bus interface unit 130. The cache memory 114 is coupled to the processing unit 118 by a plurality of multiple-bit buses 122 and 124 and to the bus interface unit 130 by a plurality of multiple-bit buses 126 and 128. In addition, the cache memory 114 is coupled to the cache controller 116 by a plurality of multiple-bit buses 132, 134 and 142.

The cache controller 116 is coupled to the processing unit 118 by a multiple-bit bus 136, and to the bus interface unit 130 by a multiple-bit bus 138. The cache controller is also coupled to control line 22 at the input 26. The bus interface unit 130 is coupled to the system memory 12 and to the slave bus-masters 18 and 20 by the bus 14.

The cache memory 114 is disposed between the system memory 12 and the processing unit 118 to provide the processing unit 118 faster access to the data that initially resides in the system memory 12. The cache memory includes a plurality of data blocks 115 for storing data, and a status storage 144 for storing data representative of the status of the data that is currently being buffered in the cache memory 114.

The bus interface unit 130 executes the data transfers between the cache memory 114 and external components, such as the system memory 12 and the slave bus-masters 18 and 20. The bus interface unit 130 executes the data transfers in response to data transfer signals received from the cache controller 116 over bus 138.

The cache controller 116 generates the data transfer signals to control the bus interface unit 130. The cache controller 116 generates the data transfer signals in response to data request signals received from the processing unit 118 over bus 136, the state of the control line 22 as detected at input 26, and the status of the cache memory 114 as detected over bus 132.

The cache controller 116 also updates the status information within the status storage 144 as the status of the data within the blocks 115 of the cache memory 114 changes. For example, the cache controller 116 may maintain in the status storage 144 of the cache memory 114 status information representative of the status of the data residing in each of blocks 115 of the cache memory 114. The status information for each cache data block typically includes whether the block is available to receive new data ("availability status"), whether the data within the block has been modified ("modification status"), whether the data within the block is shared or exclusive ("shared status"), how recently the data within the block was accessed by the processing unit 118 ("access status"), and the block of the system memory 12 from which the data contained in the cache block originated ("source information").

Figure 3:
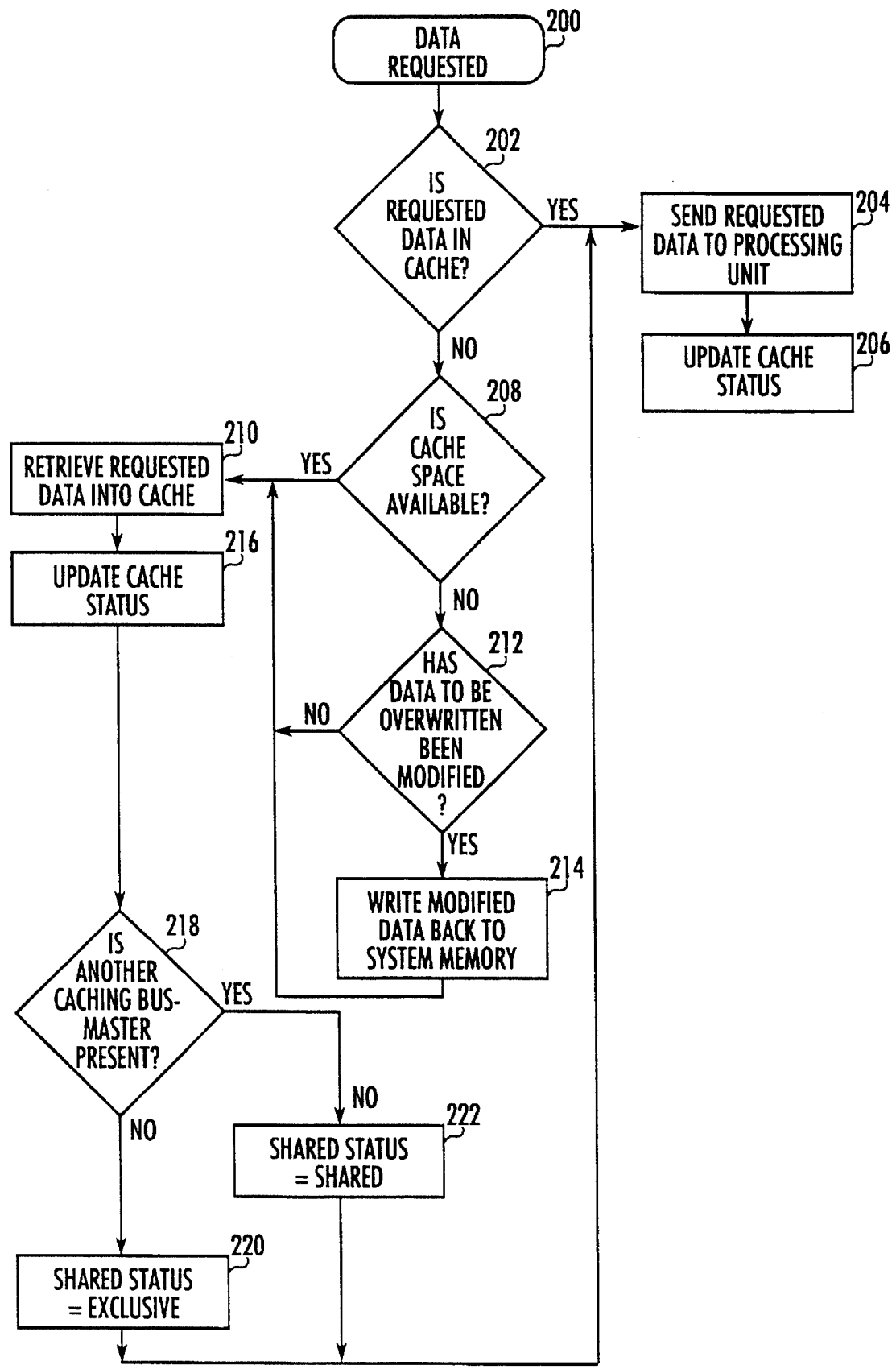
FIG. 3 is a control flow diagram illustrating the operation of a master bus-master according to one embodiment of the present invention when a data request is issued by the processing unit of the master bus-master.
Figure 4:
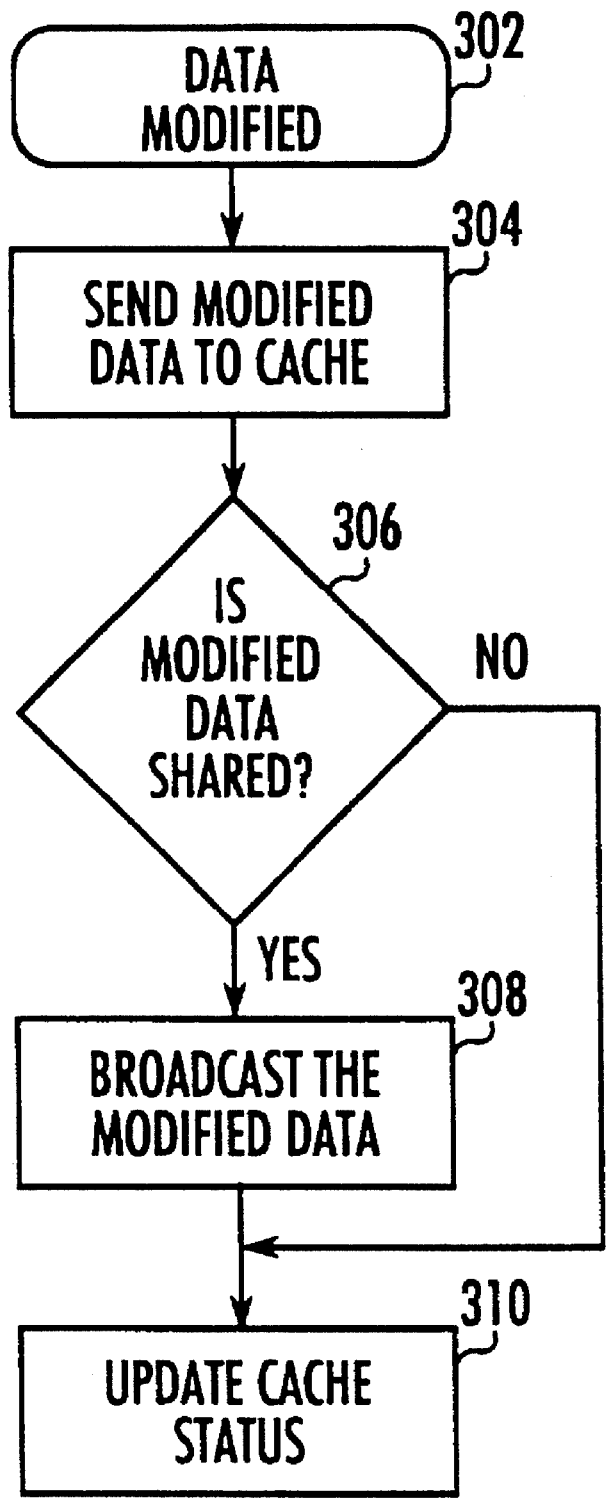
FIG. 4 is a control flow diagram illustrating the operation of a master bus-master according to one embodiment of the present invention when data has been modified by the processing unit of the master bus-master.

The operation of the master bus-master 16 will now be described with reference to FIGS. 3 and 4. When the processing unit 118 requires data, the processing unit 118 sends, in step 200, a data request signal to the cache controller 116. In step 202, the cache controller 116 reads the status of the cache memory 114 over bus 132 to determine if the requested data currently resides in the cache memory 114. If it does, the cache controller 116 transmits a control signal to the cache memory 114 over bus 142 to cause the cache memory 114 to send the requested data over bus 122 to the processing unit 118 in accordance with step 204. The cache controller 116 then, in step 206, sends a status update signal over bus 134 to the status storage 144 of the cache memory 114 to indicate that the requested data was accessed.

If the requested data does not currently reside in the cache memory 114, then, in step 208, the cache controller 116 reads the status of the cache memory 114 over bus 132 to determine whether there is space available in the cache memory 114 for the requested data. If there is space available, the cache controller 116 sends a data transfer signal to the bus interface unit 130 to cause the bus interface to read the requested data from the system memory 12 and to write the requested data into the available space in the cache memory 114 via bus 126 in accordance with step 210.

If it is determined in step 208 that there is no space available in the cache memory 114 for the requested data, the cache controller 116 will have to cause the bus interface unit 130 to write the requested data over data currently residing in the cache memory 114. However, before the data is overwritten, the cache controller, in step 212, reads from bus 132 the modified status of the block containing the data to be overwritten. If the cache controller determines that the data to be overwritten has been modified since it was stored in the cache memory 114, the cache controller 116 sends a data transfer signal over bus 138 to cause the bus interface unit 130 in step 214 to retrieve the modified data from cache memory 114 from bus 128 and to write the modified data back to the system memory 12 over bus 14 before it is overwritten in the cache memory 114 in step 210. If it is determined in step 212 that the data to be overwritten has not been modified, the process then proceeds directly to step 210.

When the requested data has been loaded into the cache memory 114, the cache controller 116 then, in step 216, updates the status of the cache block receiving the data over bus 134. Specifically, the availability status is updated to indicate that the block is not available to receive new data, the modified status is updated to indicate that the data has not been modified, the access status is updated to indicate that the data has not been accessed, and the source information is updated to reflect the location of system memory 12 from which the data originated.

The shared status is then updated in accordance with steps 218, 220, and 222. In step 218, the state of control line 22 is detected by the cache controller 116 at input 26 to determine if there is another caching bus-master present. If the state of the control line 22 indicates that no other caching bus-master is present in the system, then the shared status is updated to indicate that the requested data is exclusive in step 220. Otherwise, in step 222, the shared status is updated to indicate that the requested data is shared.

Once the status has been updated, the process proceeds to step 204 wherein the cache controller 116 sends a control signal to the cache memory 114 over bus 142 to cause the requested data to be sent over bus 122 to the processing unit 118 from the cache memory 114. The cache controller 116 also updates the access status of the cache block holding the requested data in step 206 to indicate the time that the requested data was sent to the processing unit 118.

When the processing unit 118 modifies data in step 302, the processing unit 118, in step 204, sends the modified data over bus 124 to the block in the cache memory 114 from which the modified data originated. The cache controller 116 then, in step 306, reads from bus 134 the shared status of the cache block receiving the modified data. If the cache controller determines in step 306 that the modified data is shared, the cache controller 116 sends a data transfer signal to the bus interface unit 130 to cause the bus interface unit 130 to read the modified data from the cache memory 114 from bus 128 and to broadcast the modified data over bus 14 to the system memory 12, to the slave bus masters 18 and 20, and to any other bus-master on the system in step 308. After causing the modified data to be broadcast over bus 14, the cache controller 116 in step 310 updates, over bus 134, the modified status of the cache block containing the modified data to indicate that the data was not modified. The data is considered "not modified" because, after the broadcast, all existing versions of the data reflect the modifications that were made.

On the other hand, if in step 306 it is determined that the modified data is exclusive (not shared), then the modified data is not broadcast over bus 14. Rather, it remains "modified" in the cache memory 114 until it is written back to the system memory 12 to free up space in the cache memory 114 for later-requested data, according to the process described above.

Referring again to FIG. 2, the slave bus master 18 includes a processing unit 148 and the local cache arrangement 38. The configuration of the local cache arrangement 38 corresponds to the local cache arrangement 34 of the master bus-master 16 with the exception that the local cache arrangement 38 of the slave bus-master 18 is coupled to the control line 22 at the output 28 and generates a signal at the output 28 to drive the control line 22 to a predetermined state to indicative whether the slave bus-master 18 is caching data. Also, unlike the master bus-master 16, the slave bus-master 18 assumes that another bus-master present on the system is caching data (e.g. the master bus-master). Therefore, the local cache arrangement 38 of the slave bus-master 18 marks all of the data in its cache as shared data. Consequently, the slave bus-master 18 automatically broadcasts over bus 14 any data that it modifies in its local cache arrangement 38.

While a particular embodiment of the present invention has been shown and described, modifications may be made. It is therefore intended in the appended claims to cover all such changes and modifications which fall within the true spirit and scope of the invention.

What is claimed is:

1. A master bus-master for use in a bus-based computer system having a system memory, the master bus-master being configured for caching data and for operation alone or in association with at least one other bus-master capable of caching data, said master bus-master comprising:

a processing unit;

a local cache arrangement coupled to said system memory by a bus and coupled to said processing unit, said local cache arrangement including a cache memory for caching data between said processing unit and said system memory;

a control line being set to a first initial state, said control line being capable of being set to a second state;

input means coupled to the control line for detecting whether the control line is in the first state or the second state, the control line being set to the second state by said at least one other bus-master when said at least one other bus-master capable of caching data is present in said computer system and is presently caching data, said local cache arrangement including control means for controlling transmission of data between said bus and said cache memory in response to whether said control line is in said first state or said second state, wherein said at least one other bus-master sets the control line to the first state when said at least one other bus-master is not presently caching data.

2. The bus-master of claim 1 wherein said local cache arrangement control means includes a cache controller.

3. The bus-master of claim 2 wherein said cache memory includes a plurality of data blocks and a status storage for storing status information indicative of a status of each of said plurality of data blocks.

4. The bus-master of claim 3 wherein said status information includes shared status information indicative of whether data residing in each of said plurality of data blocks is in one of a shared state and an exclusive state.

5. The bus-master of claim 4 wherein said cache controller maintains said shared status information in said status storage in response to said logic state.

6. The bus-master of claim 5 wherein said processing unit is disposed to modify said data blocks residing in said cache memory, said cache controller being arranged to broadcast said data blocks that are modified by said master bus-master over said bus when said logic state indicates that said at least one other bus-master capable of caching data is present in said computer system and is caching data in said computer system.

7. The master bus-master of claim 6 wherein said master bus-master is a microprocessor.

8. The bus-master of claim 1, wherein said input means is arranged to prevent broadcast of said data blocks that are modified by said master bus-master over said bus when said logic state indicates that said at least one other bus-master capable of caching data is present in said computer system and is not caching data in said computer system.

9. A bus-based computer system, comprising:

a system memory;

a bus coupled to said system memory;

a control line having a logical state, said logical state initially being set to a first state, said control line also being capable of being set to a second state;

a first bus-master capable of caching data, said first bus-master setting said control line to said first state when said first bus-master is presently caching data, said first bus-master setting said control line to said second state when said first bus-master is not presently caching data;

a second bus-master, said second bus-master including,
  a processing unit,
  detecting means coupled to said control line for detecting whether said control line is in said first state or said second state; and
  a local cache arrangement coupled to said bus, to said detecting means, and to said processing unit, for caching data between said processing unit and said system memory, said local cache arrangement controlling transmission of data between said processing unit and said system memory in response to whether said control line is in said first state or said second state.

10. The computer system of claim 9 wherein said local cache arrangement includes:

a cache memory having a status storage, said status storage holding status data indicative of a status of the data currently residing in said cache memory; and a cache controller coupled to said cache memory and configured to control data transfer between said cache memory and said system memory, and configured to maintain said status data.

11. The computer system of claim 10 wherein said status data includes information on whether said data currently residing in said cache memory is shared or exclusive, said cache controller maintaining said shared status data in response to said logical state of said control line.

12. The computer system of claim 10 wherein said cache controller marks said shared status data to indicate that data in a selected data block of said cache memory is exclusive when said logical state is said first state, and to indicate that said data in said selected data block of said cache memory is shared when said logical state is not said first state.

13. The computer system of claim 9 further comprising a slave bus-master coupled to said system memory by said bus, said slave bus-master including a driving means coupled to said control line for driving said control line to a second state when said slave bus-master is caching data from said memory, and for driving said control line to said first state when said slave bus-master is not caching data from said memory.

14. A method for preventing unnecessary data broadcasts by a caching bus-master in a bus-based computer system, comprising the steps of:

a) providing a control line with a first initial logical state;

b) coupling said caching bus-master to said control line;

c) coupling a second bus-master to said control line;

d) causing said second bus-master to drive said control line to a second state if said second bus-master is presently caching data;

e) causing said second bus-master to drive said control line to said first state when said second bus-master is not presently caching data, f) causing said caching bus-master to detect whether said control line is at said first state or at said second state; and g) causing said caching bus-master to broadcast modified data only when control line is at said second state.

15. The method of claim 14 wherein said caching bus-master and said second bus-master are coupled to a system memory by a bus, the method further comprising the step of causing said caching bus-master to broadcast modified data to said second bus-master over said bus when said control line is at said second state.

16. The method of claim 15 wherein said caching bus-master includes a processing unit and a cache memory for storing data, said cache memory having a status storage for storing status data indicative of a status of data stored in said cache memory, the method further comprising the steps of reading said status data when said processing unit requests data, and determining based upon said status data whether said requested data resides in said cache memory.

17. The method of claim 16 further comprising the steps of retrieving said requested data from said system memory over said bus when said requested data does not reside in said cache memory, and storing said retrieved requested data in said cache memory.

18. The method of claim 17 further comprising the steps of updating said status data to indicate that said retrieved requested data is exclusive when said control line is at said first logical state, and updating said status data to indicate that said retrieved requested data is shared when said control line is at said second logical state.

19. The method of claim 13, wherein said second bus-master is in one of a caching mode and a non-caching mode, and wherein said second bus-master drives said control line to said second state when said second bus-master is in said caching mode, and said second bus-master drives said control line to said second state when said second bus-master is in said non-caching mode.

20. The method of claim 13, further comprising the steps of:

h) coupling a third bus-master to said control line;

i) causing said third bus-master to drive said control line to a second state if said third bus-master is presently caching data;

j) causing said second and third bus-masters to drive said control line to said first state only when both said second and third bus-masters are not presently caching data.

* * * * *